United States Patent [19]

Pedersen

[11] 3,740,483

[45] June 19, 1973

[54] TIME DIVISION SWITCHING SYSTEM WITH BILATERAL TIME SLOT INTERCHANGERS

[75] Inventor: Thomas Josef Pedersen, Lincroft, N.J.

[73] Assignee: Bell Telephone Laboratories, Incorporated, Murray Hill, N.J.

[22] Filed: Dec. 30, 1971

[21] Appl. No.: 214,144

[52] U.S. Cl. .......... 179/15 AQ

[51] Int. Cl. .......... H04j 3/00

[58] Field of Search .......... 179/15 AQ, 18 GF

[56] References Cited

UNITED STATES PATENTS

| | | | |
|---|---|---|---|
| 3,458,659 | 7/1969 | Sternung | 179/15 AQ |
| 3,461,242 | 8/1969 | Inose | 179/15 AQ |
| 3,236,951 | 2/1966 | Yamamoto | 179/15 AQ |
| 3,263,030 | 7/1966 | Stiefel | 179/15 AQ |

*Primary Examiner*—Kathleen H. Claffy
*Assistant Examiner*—David L. Stewart
*Attorney*—R. J. Guenther and William L. Keefauver

[57] ABSTRACT

A bilaterial time slot interchanger with two registers and means for interchanging the contents of one register with those of the other is used in a time division multiplex communication system to provide time slot interchange functions for both connections in a two way communication. The apparatus takes advantage of the symmetry between the two connections to eliminate hardware redundancy in the interchangers themselves and to achieve control simplicity in the associated memory equipment. Bilateral time slot interchangers are, in typical embodiments of switching systems connected in links to crosspoint storage switching arrays or to junctor gate switching arrays.

7 Claims, 16 Drawing Figures

PATENTED JUN 19 1973

3,740,483

SHEET 2 OF 5

LINE 10

LINE 13

LINE 12

LINE 11

| | |
|---|---|
| 110 | TIME SLOT 1 |
| 111 | TIME SLOT 2 |
| 100 | TIME SLOT 3 |
| 001 | TIME SLOT 4 |
| 011 | TIME SLOT 5 |
| 101 | TIME SLOT 6 |
| 010 | TIME SLOT 7 |

PATENTED JUN 19 1973 3,740,483

SHEET 5 OF 5

TIME DIVISION SWITCHING SYSTEM WITH BILATERAL TIME SLOT INTERCHANGERS

BACKGROUND OF THE INVENTION

This invention relates to time division multiplex communication systems. It relates more particularly to time division switching systems employing time slot interchange devices.

The most common current practice in communication systems generally is to establish a solid connection between a calling line and a called line via a path which is associated individually and uninterruptedly with the connection for the duration of the call. Thus a quantity of equipment, dependent upon the number of lines served and the expected frequency of service, is provided in a common pool from which portions may be chosen and assigned to a particular call. Such an arrangement is referred to as "space division" in which the privacy of each conversation is assured by the division or separation of individual conversations in space.

In contrast, communication systems have been developed which operate on a time division basis in which a number of conversations share a single spatial communication highway. Privacy of conversation is assured in such systems by the division or separation of individual conversations in time. Thus each conversation is assigned to the common spatial highway for an extremely short, periodically recurring interval, called a time slot, and the connection between any two lines in communication is completed only during the assigned interval or time slot. Samples which retain essential characteristics of the voice or other signal are transmitted over the common highway in these time slots and are utilized in the called line to reconstruct the original signal.

A critical porblem is presented in both space and time division systems when one or more stages of switching are interposed between the calling and called lines. This problem is termed "blocking" and arises when a portion of the switched path is not available for assignment to a potential connection.

Space division networks minimize the blocking problem primarily through redundancy of available network paths which, of course, is expensive. Time division networks treat the problem by interchanging the time slots assigned to particular call connections in various stages of the network. This is accomplished by incorporating delay in the common highways or intermediate the switching elements. Thus a conversation transmitted in one time slot on a first highway may be shifted to different time slots in successive highways to which it is switched enroute to its destination. The provision of a capability for rearranging the time slots on which a given conversation is transmitted allows a significant reduction in the blocking probability as compared to a system of equal spatial cross-section without such a capability. Collectively, the techniques for providing such a capability have come to be known as time slot interchanging.

In general, time slot interchanging has been accomplished by selectively introducing delay in the path of signals arriving in given time slots so that upon exiting the switching system they appear in different time slots. Such techniques are described, for example, in U.S. Pat. Nos. 3,172,956, 3,446,917, and 3,461,242 issued to H. Inose et al. on Mar. 9, 1965, Mar. 27, 1969, and Aug. 12, 1969, respectively, and in H. Inose et al., "A Time Slot Interchange System in Time-Division Electronic Exchanges," IEEE Trans., Vol. CS-11, p. 336 (September 1963); C. Y. Lee, "Analysis of Switching Networks," B.S.T.J., Vol. 34, p. 1287 (November 1955); and U.S. Pat. No. 3,573,381 issued to M. J. Marcus on Apr. 6, 1971.

The aforementioned Marcus U.S. Pat. No. 3,573,381 describes a switching network with crosspoint storage which performs not only a spatial switching function, but also a time slot rearrangement function. It is a characteristic of this type of network that the time slot assignments of some calls in progress are usually changed when a new call is set up or an existing call is released. More conventional switching networks, such as those comprising junctor gate arrays, do not themselves provide a time slot rearrangement function. In these conventional networks, time slot assignments for particular calls remain unchanged for the duration of those calls.

It is desirable, in time division multiplex communication systems based on both conventional switching networks and networks of the crosspoint storage variety to include time slot interchanger devices. The use of such devices in conjunction with conventional switching networks is described in the aforementioned Inose et al. U.S. Pat. Nos. 3,172,956, 3,446,917, and 3,461,242.

The characteristic of switching networks of the crosspoint storage variety relating to time slot reassignment of existing calls upon setup of a new call or release of a completed call imposes certain requirements on the design of time slot interchangers suitable for use in conjunction with these networks. It is an object of this invention to provide a time slot interchanger which is in all respects compatible with bilateral switching networks of the crosspoint storage variety and with switching networks generally which provide for time slot reassignment of existing calls when a new call is set up or a completed call is released.

Since delay elements used in time slot interchangers are expensive, it is advantageous to minimize the number of delay elements required to perform the time slot interchange function. Accordingly, it is an object of this invention to provide new apparatus for time slot interchanging, suitable for use in systems employing switching networks of the crosspoint storage variety, which makes efficient use of hardware delay elements. This new time slot interchanger apparatus may also be used in systems employing conventional switching networks, although this use is somewhat less desirable in terms of efficiency.

Furthermore, additional hardware elements, in the form of contol memories, are typically required in systems utilizing time slot interchangers. These memories are required to control the time slot interchange devices in accordance with some stored specification of the routing of the calls in progress. This control memory often represents a considerable portion of the entire switching system hardware. It is therefore also desirable to minimize the amount of memory required to perform this control function. It is then another object of this invention to provide time slot interchange apparatus which can be controlled with minimal memory facilities.

Whenever time division multiplex switching systems are used for two-way communication, it is essential to establish two separate paths between each pair of calling and called subscribers. In a conversation between subscribers A and B, for example, there will exist one transmission path from A to B and another transmission path from B to A. In most efficient switching system organizations, there will exist inherent symmetries, both spatial and temporal, between these two paths. To illustrate the temporal symmetry consider that the transmission path from subscriber A to subscriber B requires a transposition from time slot 1 to time slot 5. Due to the aforementioned symmetry, the transmission path from subscriber B to subscriber A will require a transposition from time slot 5 to time slot 1. In general, the specification of the required time slot mapping for one of the connections making up a call determines uniquely the time slot mapping for the other connection. It is another object of this invention to provide for the exploitation of the inherent symmetry in switching systems in order to eliminate redundancy and to achieve desired hardware economy and control simplicity.

When time slot interchangers are included in complete switching systems, a problem may arise with respect to the timing of call setup and release operations. It is still another object of this invention to provide a time slot interchanger designed to facilitate efficient timing of call setup and release operations.

SUMMARY OF THE INVENTION

These and other objects are achieved in accordance with a typical embodiment of the present invention through the utilization of shared hardware delay elements to provide the two time slot transpositions required for each two-way communication. A new device, termed a "bilateral time slot interchanger," incorporates these shared hardware delay elements in an arrangement wherein the functions of two separate prior art time slot interchangers are performed. The bilateral time slot interchanger is suitable for efficient use in communication systems wherein the time slot assignments of existing calls are subject to reassignment upon setup of a new call or release of a completed call.

In a preferred embodiment the hardware delay elements take the form of first and second register means. Means are included to enable the exchange of the contents of the first register means with those of the second register means.

In operation, a first input sequence of binary signals is applied to the first stage of the first register means. These signals are transferred to successive stages in the sequential time slots of a time division multiplex signal frame. The signals are then transferred to the second register means. In the time slots of the subsequent time division multiplex signal frame, the signals stored in the stages of the second register means are selected in a designated order and provided as outputs. Thus a first transmission path through the bilateral time slot interchanger is provided whereby a first input sequence of binary signals applied to the first stage of the first register means results in an output sequence of reordered binary signals being made available as outputs from th second register means.

Binary signals from a second input sequence are applied to the stages of the second register means as those stages are selected in the aforementioned designated order in each signal frame. The second input sequence depends only upon the message data being processed and, in general, bears no relationship to the first input sequence. The signals stored in the second register means are then transferred to the stages of the first register means. In the subsequent frame the signals are advanced to successive stages of the first register means in sequential time slots, until they reach the final stage, whereupon they become available as outputs. Thus a second transmission path is provided whereby a second input sequence of binary signals selectively applied to stages of the second register means results in an output sequence of reordered binary signals being made available at the final stage of the first register means.

The aforementioned first register means may typically comprise a shift register having *n* stages, where *n* is the number of time slots used for message traffic in a signal frame. The second register means may typically comprise *n* flip-flop devices of the "delay" or "D" type.

It is found that the time slot mapping for each transmission path through a bilateral time slot interchanger, corresponding to one connection in a two-way communication, is complementary to the time slot mapping for the transmission path corresponding to the other connection in the same two-way communication. Therefore, a control memory containing a single control memory word for each time slot may be used to direct the operation of the device. In a preferred embodiment, a decoder decodes control memory words and enables control lines, which in turn enable selected stages of the second register means. The selected stages transmit as outputs binary signals previously stored therein while traversing the aforementioned first transmission path and receive as inputs binary signals traversing the second transmission path.

The bilateral time slot interchanger described in this application is especially suitable for use in switching systems wherein bilateral time slot interchangers are connected in links between stages of a switching network. The switching stages may typically compirse junctor gate arrays, which provide a space division switching capability, while the bilateral time slot interchangers provide a time division capability. Alternately, the switching stages may be of the crosspoint storage variety, in which case they provide both space and time division switching capabilities. The bilateral time slot interchangers then provide an additional time division switching capability. In order to provide the most suitable conditions for call setup and release in switching systems of the crosspoint storage variety, one-frame delays are provided on certain input and output lines of a bilateral time slot interchanger.

The organization and operation of bilateral time slot interchangers according to the instant invention, as well as their physical and operational relationships to the other elements of a switching system, can be best understood with reference to the drawing and the accompanying detailed description.

DETAILED DESCRIPTION

Data in a time division multiplexed communication system occurs in intervals known as time slots. Each time slot typically corresponds to a particular communication channel. Time slots are grouped together into frames, a frame being the largest sequence of successive time slots which includes no more than one time slot corresponding to a given communication channel.

Figure 1A:
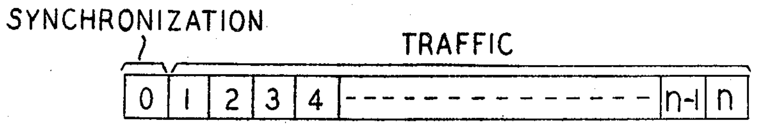
FIGS. 1A–1E show representations of the time slots of a data frame and various binary signals which may appear in those time slots during the operation of a bilateral time slot interchanger.

FIG. 1A shows a time division multiplex signal frame having $n + 1$ time slots. The number $n$ in FIG. 1A is equal to the number of traffic time slots in a frame. Traffic time slots are those time slots which represent sampled communication data, and are to be distinguished from other time slots in a frame which may be added for purposes of synchronization. Each numbered box within FIG. 1A represents a particular time slot. The single synchronization time slot is numbered "0," while the $n$ traffic time slots are numbered 1 through $n$.

Figure 1B:
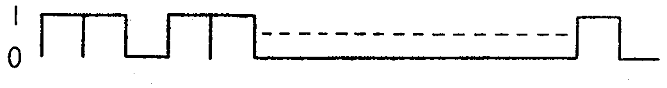
Figure 1C:
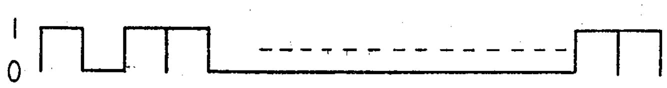

As indicated in FIGS. 1B and 1C, information is carried in each traffic time slot in the form of a binary "1" or "0." Thus each time slot corresponds to one bit. In general time division communication systems may be designed so that each time slot corresponds to $q$ bits, where $q$ is a positive integer. If $q$ is greater than one, each time slot will contain sampled data comprising more than one bit. For purposes of clarity, the discussion here is restricted to a system where $q = 1$. However, as will be apparent to those skilled in the art, generalizations to systems where $q > 1$ are easily made. The present invention, therefore, is in no way restricted to systems having only one bit per time slot.

Although the frame shown in FIG. 1A has only a single synchronization time slot, it should be noted that a plurality of synchronization time slots may be used to provide necessary or desirable synchronization and error-checking capabilities. A time division signal frame with one synchronization time slot is used for purposes of illustration only, and the instant invention is in no way restricted to systems employing only a single synchronization time slot. It should be pointed out that synchronization data is not necessarily carried on the same communication lines as message data. Rather synchronization pulses on specially dedicated control lines, occurring in the synchronization time slots, more typically provide synchronization, as well become clear later in this detailed description.

In accordance with the objects of this invention it is desirable to provide for the rearrangement of data carried in the traffic time slots of input data sequences. FIG. 1B illustrates sample data such as may appear in one such input data sequence (one input frame). FIG. 1C illustrates a sequence of binary data which may result from the rearrangement of the data of FIG. 1B. It is noted that the numbers of binary "1's" and of binary "0's" in the traffic time slots of FIG. 1B are preserved in the rearranged data of FIG. 1C. Only the ordering of the binary digits is altered.

A single time slot interchanger of the prior art will typically function to transform a single sequence of such data as illustrated in FIG. 1B into rearranged data as illustrated in FIG. 1C. The present invention is equipped to handle efficiently two such input sequences as shown in FIG. 1B. The two input sequences will be determined only by the communication data in the channels which they represent and in general, therefore, will bear no relation to one another.

Figure 2:
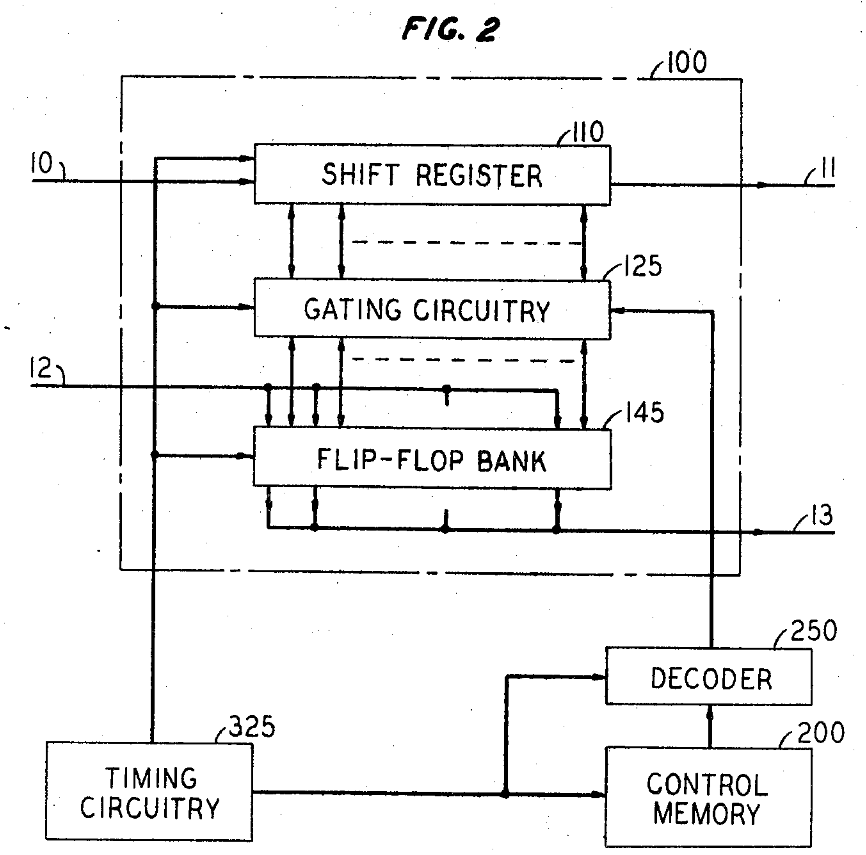
FIG. 2 shows in block diagram form a typical embodiment of a bilateral time slot interchanger in accordance with the present invention, together with associated control devices.

FIG. 2 illustrates in block diagram form a bilateral time slot interchanger 100 and its associated control circuitry in accordance with one embodiment of the instant invention. This apparatus may be used to transform two input data sequences into two output data sequences which are rearrangements of the data in the input sequences. This apparatus comprises shift register 110 and flip-flop bank 145, which are connected via gating circuitry 125 in such a manner as to enable the parallel transfer of data between shift register 110 and flip-flop bank 145. Timing circuitry 325 provides timing signals to the remainder of the circuitry of FIG. 2. Control memory 200 stores words which indicate the rearrangements of data between various time slots which are to be made. Decoder 250 directs the operation of gating circuitry 125 according to instructions encoded in words received from control memory 200.

In the operation of bilateral time slot interchanger 100, a first input data sequence arrives at shift register 110 via input line 10. Bits from the traffic time slots of a frame in this first sequence are sequentially stored in shift register 110 until bits 1 through $n$ have been stored. During the synchronization time slot "0" of the next frame, gating circuitry 125 is directed by timing circuitry 325 and decoder 250 to transfer the contents of shift register 110 to flip-flop bank 145. During the traffic time slots 1 through $n$ of this latter frame, gating circuitry 125 directs flip-flop bank 145 to selectively transmit its contents to output line 13. The contents of flip-flop bank 145 will, in general, be transmitted in a different order from the order in which the bits contained therein were originally received in shift register 110. Gating circuitry 125 is controlled by control memory 200 in conjunction with decoder 250. Control memory 200 typically contains, for each time slot, a word which designates the appropriate bit which is to be transmitted from flip-flop bank 145 in that time slot. The read-out of these words is synchronized with the read-in of bits on line 10 so that one word is read in each traffic time slot. The words are decoded in decoder 250. Gating circuitry 125 is then responsive to the decoded words to direct the transmission of appropriate bits on line 13. Since the control memory 200 may be encoded in such a manner as to direct the transmission of the bits stored in flip-flop bank 145 in any preselected order, it is clear that any preselected reordering of data in the traffic time slots may be achieved.

As the above-described reordering of input data received on input line 10 to form output data transmitted on output line 13 takes place, a second data reordering operation takes place simultaneously. In this latter data reordering operation, input data received on input line 12 are reordered to form output data transmitted on output line 11. This second input sequence of data is presented via input line 12 to flip-flop bank 145. The second input sequence is synchronized with the aforementioned first input sequence. In contrast to the first input data sequence arriving at shift register 110, the second input data sequence is stored in flip-flop bank 145 not sequentially, but in an order designated by the contents of control memory 200. The same control memory words which designate the bits to be transmitted from flip-flop bank 145 also designate the positions to be occupied by the newly received bits from input line 12. Simply stated, each newly received bit from input line 12 takes the place of the bit transmitted on output line 13 in that time slot. At the conclusion of the $n^{th}$ traffic time slot of a frame, the $n$ bits representing the message data of that frame are stored in flip-flop bank 145 in a permuted order. During the synchronization time slot of the succeeding frame, the contents of flip-flop bank 145 are exchanged with the contents of shift register 110. During the traffic time slots of this succeeding frame, the bits stored in shift register 110 are sequentially transmitted on output line 11.

It is clear that the reordering operation performed on the second input sequence arriving at line 12 is different from the reordering operation performed on the first input sequence arriving at line 13. It is also clear, however, that the two reordering operations are related, since both are directed by the contents of control memory 200, which determines the order in which bits are read into and transmitted from flip-flop bank 145. In fact, the two reordering operations are complementary to each other in that if a bit received, for example, in time slot 1 on input line 10 is transmitted in time slot 5 of the succeeding frame on output line 13, then a bit received in time slot 5 on input line 12 is transmitted in time slot 1 of the succeeding frame on output line 11.

In general, it may be stated that the time slot interchanger 100 of FIG. 2, together with its associated control circuitry, provides two data paths. The first data path is from input line 10 to shift register 110, to flip-flop bank 145, via gating circuitry 125 and thence to output line 13. The second data path is from input line 12 to flip-flop bank 145, to shift register 110 via gating circuitry 125 and finally, to output line 11. The two data paths provide complementary time slot interchange functions in that a transposition of data from time slot $j$ to time slot $k$ in the first data path is associated with a transposition of data from time slot $k$ to time slot $j$ in the second data path. These complementary time slot interchange functions are precisely those required to provide two-way communication between two users.

The above description of the time slot transpositions which take place in the bilateral time slot interchanger of FIG. 2 has been general. A more detailed explanation of the time slot transpositions and the manner in which they take place, aided by use of specific examples, appears below in the discussion of FIGS. 5A–5D in conjunction with the more detailed apparatus of FIG. 3.

It is to be noted that in the embodiments of the instant invention described herein, rearrangements of data take place only within integral frames. Data is not transferred between frames.

Figure 3:
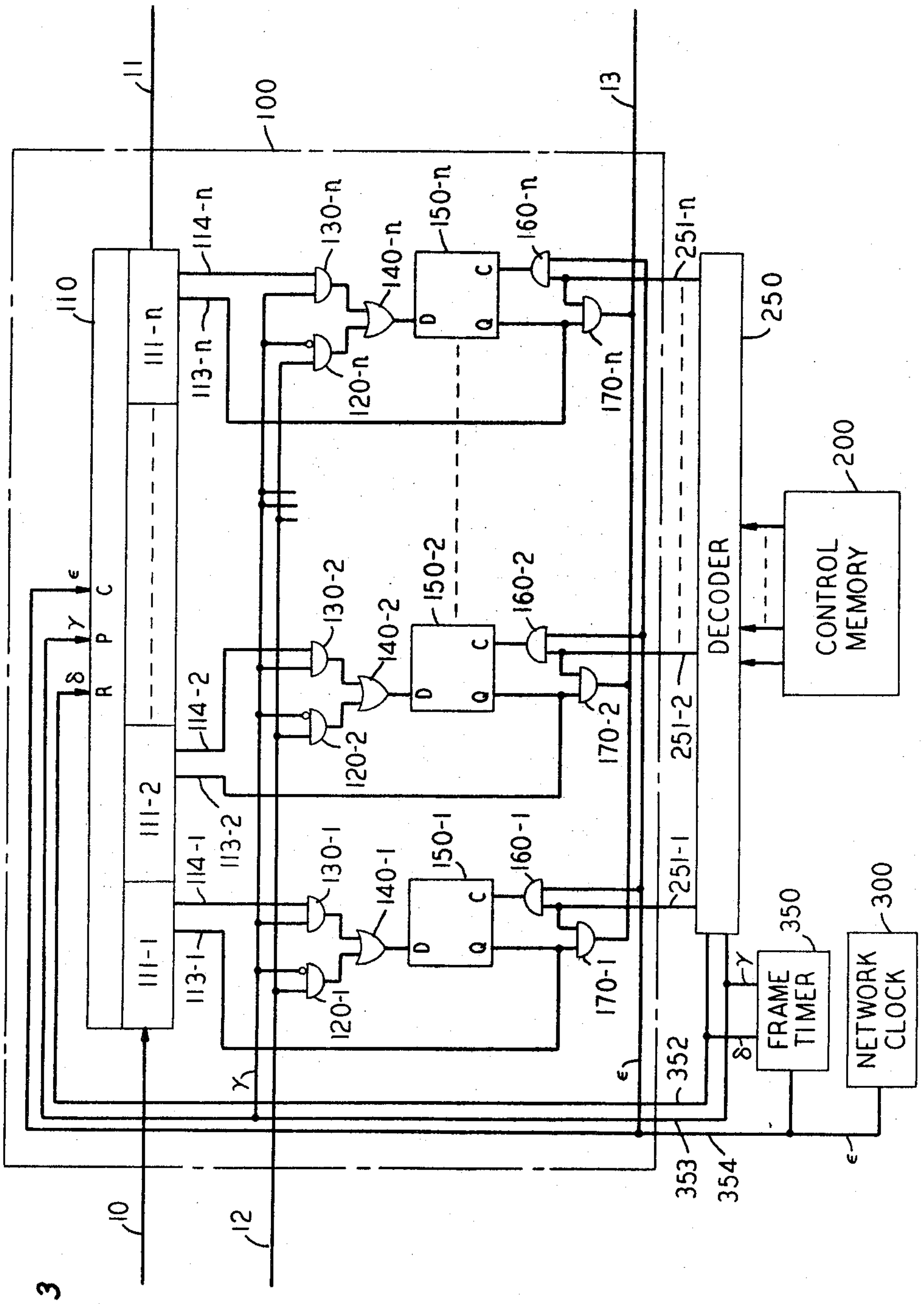
FIG. 3 shows in more detail a typical embodiment of a bilateral time slot interchanger constructed according to the teachings of this invention.

FIG. 3 shows a particular embodiment of bilateral time slot interchanger 100 and its associated circuitry in greater detail. In FIG. 3, shift register 110 is seen to comprise $n$ stages. Each of the stages of shift register 110 is separately designated $111-i$, where $i = 1,2, \ldots, n$. Each of the respective stages in turn has a parallel input lead $113-i$ and a parallel output lead $114-i$. Additionally, stage $111-1$ is arranged to receive serial input data via input line 10, and stage $111-n$ is arranged to transmit serial output data on output line 11. Clock pulses are applied at clock pulse input terminal C.

Figure 4:
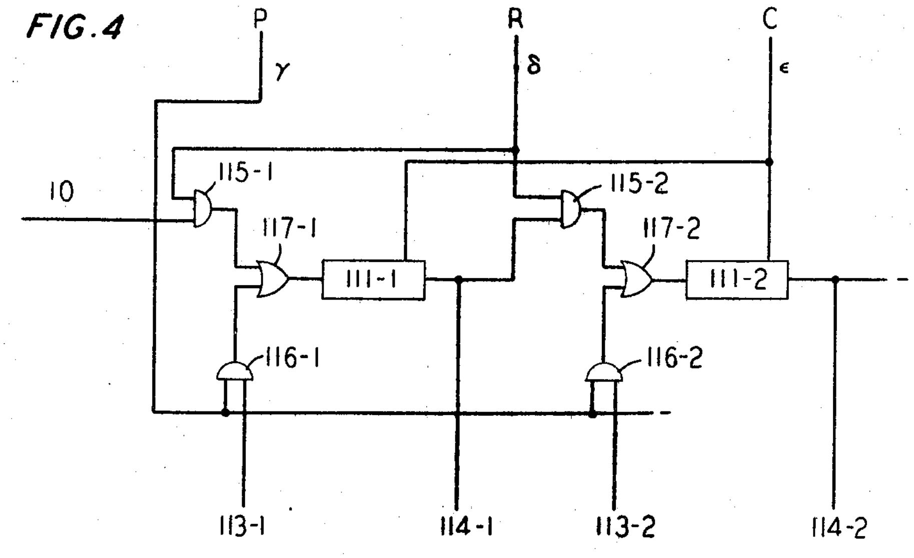
FIG. 4 shows a logical interconnection of shift register stages such as is used in the bilateral time slot interchanger of FIG. 3.

Both serial and parallel modes of operation of shift register 110 are provided, according to whether serial-enabling input terminal R or parallel-enabling input terminal P is activated. Detailed circuitry for accomplishing this mode selection is shown in FIG. 4 and will be described below. In the serial mode, each clock pulse received causes a bit to be read in at stage $111-1$ from input line 10. The clock pulses are, in fact, synchronized with the arrival of data on line 10. Simultaneously, the bits which were in stages $111-i$, $i = 1,2, \ldots, n-1$, before arrival of the clock pulse are advanced, respectively, to stages $111-(i+1)$. That is, each bit is shifted one stage to the right. The bit previously stored in stage $111-n$ is caused to be transmitted on output line 11. In the serial mode, bits present at parallel inputs $113-i$ are ignored.

In the parallel mode of operation of shift register 110, bits are not advanced serially upon the arrival of a clock pulse. Rather, bits stored in each shift register stage $111-i$ are transmitted on parallel output leads $114-i$, and, simultaneously, new data is received and stored in each stage $111-i$ from its corresponding parallel input lead $113-i$. In the parallel mode, bits present at input line 10 are ignored.

Shift register 110 is of standard design. However, to clarify the manner in which control signals applied at input terminals R and P determine the two alternate modes of operation, a diagram of a typical logical interconnection of stages $111-1$ and $111-2$ is shown in FIG. 4. In FIG. 4, serial enabling input terminal R is connected as an input to each of AND-gates 115–1 and 115–2. When the control signal $\delta$ at input terminal R is TRUE, a serial data path is provided from input line 10 through AND-gate 115–1, OR-gate 117–1, stage 111–1, AND-gate 115–2, OR-gate 117–2, and stage 111–2. When the control signal $\delta$ at input terminal R becomes FALSE and the control signal $\gamma$ at input terminal P becomes TRUE, this serial data path is disabled. Instead, an input-output data path is provided for each stage. For example, a data path is provided from parallel input lead 113–1 through AND-gate 116–1, OR-gate 117–1, and flip-flop 111–1, to parallel output lead 114–1. The clock pulse $\epsilon$ from clock input terminal C is furnished to each of stages 111–1 and 111–2. FIG. 4 is meant to be merely typical of possible logical interconnections in shift register 110 and is not to be construed as imposing a limitation upon shift register circuitry which may be used in the practice of this invention.

Returning to FIG. 3, flip-flops $150-i$, where $i = 1,2, \ldots, n$, form the flip-flop bank 145 of FIG. 2. These flip-flops are, in the embodiment illustrated, well-known type D, or delay, flip-flops. Type D flip-flops are described for example in N. M. Morris, Logic Circuits, McGraw-Hill (1969), p. 77. Each flip-flop $150-i$ is associated with a corresponding shift register stage 111—*i* by means of the interconnecting arrangements labeled gating circuitry 125 in FIG. 2. Gating circuitry 125 corresponds in FIG. 3 to the combination of AND-gates 120—*i*, 130—*i*, 160—*i*, and 170—*i*, together with OR-gate 140—*i*, where $i = 1,2, \ldots, n$. The interconnection of these several gates appears explicitly in FIG. 3, and their manner of operation will become apparent in discussion of the overall operation of the bilateral time slot interchanger which is to follow.

Figure 1D:
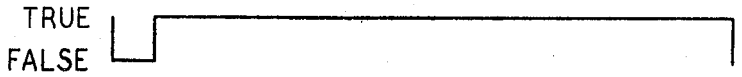
Figure 1E:
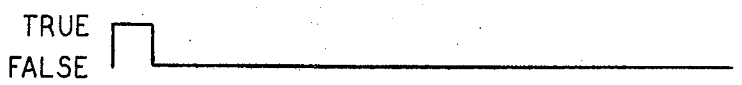

Timing circuitry 325 of FIG. 2 comprises network clock 300 and frame timer 350 of FIG. 3. Network clock 300 is designed to produce a clock pulse signal, designated $\epsilon$, in each time slot of each frame. Frame timer 300 contains standard counting circuitry which is used to derive from network clock signal $\epsilon$ a frame control signal $\delta$ which is TRUE only in the traffic time slots of each frame and a frame control signal $\gamma$, which is TRUE only in the synchronization time slot of each frame. FIG. 1D shows a representation of signal $\delta$, and FIG. 1E shows a representation of signal $\gamma$. Network clock pulse signal $\epsilon$ is transmitted from network clock 300 on control line 354, which leads to frame timer 350, to clock input terminal C of shift register 110, and to one input of each of AND-gates 160—*i*. Frame control signal $\delta$ is transmitted from frame timer 350 on control line 352, which leads to serial enabling input terminal R of shift register 110 and to decoder 250. Frame control signal $\gamma$ is transmitted from frame timer 350 on control line 353, which leads to decoder 250, to parallel enabling input terminal P of shift register 110, and to the "inhibit" input of each of AND-gates 120—*i*.

Control memory 200 of FIG. 3 is preferably a memory designed to be accessed serially, rather than on a random basis. For example, a memory of the reentrant shift register type well known in the telephone switching arts may be used. Alternately, a memory of the general type exemplified by the recirculating delay line and pulse shifter control described with reference to FIG. 5 of U.S. Pat. No. 3,446,917, issued to H. Inose et al. on May 27, 1969, may be used. Decoder 250 is advantageously a simple decoding matrix designed to select a unique one of control lines 251—*i* for each different word read from control memory 200. The operation of decoder 250 will become amply clear in the discussion below of the operation of bilateral time slot interchanger 100 in conjunction with a specific set of control memory words. The specific design of the decoder is straightforward and will depend upon the encoding scheme chosen for the control memory.

The operation of the bilateral time slot interchanger 100 of FIG. 3 and its associated equipment will now be considered. Shift register 110 is adapted to receive via line 10 an input sequence of binary signals. As was previously noted, a sequence of binary signals such as might typically appear on line 10 is represented in FIG. 1B. As can be seen, one binary signal appears during each traffic time slot. It is the function of bilateral time slot interchanger 100 to appropriately reorder the *n* binary signals representing the traffic time slots of each frame. Thus, for example, the binary signals of FIG. 1B may be reordered to form the sequence of binary signals represented in FIG. 1C. In FIG. 3 the reordered sequences of binary signals corresponding to the input signals received on lead 10 appear on output line 13.

Similarly, the bilateral time slot interchanger of FIG. 3 is adapted to receive a second sequence of binary input signals via line 12. The binary signals in the traffic time slots of this second sequence are reordered to form a second reordered sequence of binary signals. This latter sequence appears on output line 11.

The reordering, or mapping, of the signals which are received on lead 10 and transmitted on line 13 bears a complementary relationship to the reordering, or mapping, of the signals which are received on line 12 and transmitted on line 11. Specifically, if data in time slot *j* on line 10 appears in time slot *k* of line 13, then data in time slot *k* of line 12 will appear in time slot *j* of line 11. The nature of this complementary relationship is such that symmetry requirements of the talking paths between calling and called subscribers will be fulfilled if the bilateral time slot interchanger is connected as a part of a complete time division switching system.

The bilateral time slot interchanger 100 is directed to perform the above-described functions by the time slot interchanger control memory 200, its associated decoder 250, frame control signals $\delta$ and $\gamma$ and the network clock pulse signal $\epsilon$. During the synchronization time slot of each frame, $\gamma$ is made TRUE and $\delta$ is made FALSE. During the traffic time slots of each frame $\gamma$ is made FALSE and $\delta$ is made TRUE. Representations of signals $\delta$ and $\gamma$ are shown in FIGS. 1D and 1E respectively. The network clock pulses are furnished by network clock 300, which is of standard design. As was noted above, frame control signals $\delta$ and $\gamma$ may be derived from the network clock pulses by the use of standard counting circuitry which is contained in frame control timer 350.

In the traffic portion of each frame (consisting of time slots 1 through *n* in FIG. 1A) frame control signal $\delta$ is TRUE and frame control signal $\gamma$ is FALSE. Therefore the n-stage shift register 110 of FIG. 3 is serially enabled so that it loads and shifts bits from input line 10 and delivers bits (from the previous frame which appeared on input lead 12) to output line 11. At the end of a frame, the bits in the traffic time slots of that frame which were received from line 10 are right justified in the shift register 110. That is, the bit from time slot 1 occupies the rightmost stage 111—*n* of the shift register 110, and the remaining bits are ordered from right to left.

In the traffic portion of each frame, simultaneous with the shift register operations of the above paragraph, the decoder 250 decodes, in each time slot, a word from the control memory 200 and uses this word to cause a bit from line 12 to be loaded into a selected one of the flip-flops 150—1 through 150—*n*. Concurrently, the output of the selected flip-flop is transmitted to line 13. A different control word is decoded in each traffic time slot of a frame so that a different control line from the group of control lines 251—1 through 251—*n* is selected in each time slot of an input frame. The selected control line 251—*i* is made TRUE and the remaining, unselected, control lines are kept FALSE.

For a better understanding of the operation of flip-flops 150—1 through 150—*n*, consider that in a given time slot a control memory word is decoded in decoder 250 so that control line 251—2 is made TRUE. The signal on this control line 251—2 in conjunction with the network clock signal $\epsilon$ opens AND-gate 160—2. The output of AND gate 160—2 therefore furnishes a pulse to the clock input terminal C of flip-flop 150—2. The flip-flop 150—2 is thus enabled to receive and store the bit present at its D input terminal. This bit is simply the bit from line 12 present during the time slot. Since the signal entering the "inhibit" input of each AND gate 120—1 through 120—*n* is FALSE, the bit from line 12 appears at the output of each AND-gate 120—1 through 120—*n*. Gates 140—1 through 140—*n* are OR-gates. Therefore the signal present on line 12 also appears at the output of each of these OR-gates. Each of these outputs is connected to the D input of a corresponding one of flip-flops 150—1 through 150—*n*. In the time slot to which attention is presently directed, however, the input bit from line 12 has an effect only on flip-flop 150—2, since it is the only flip-flop which receives a clock pulse in that time slot. The input bit from line 12 is caused to be stored in flip-flop 150—2. The bit previously stored in this flip-flop is transmitted through AND gate 170—2 to output line 13, since AND gate 170—2 is furnished a TRUE input from control line 251—2.

The control memory 200 directs the decoder 250 to enable in turn each of the control lines 251—1 through 251—*n* in an order determined by stored information representing the required time slot interchanges. At the conclusion of each frame the bits from input line 12 will, as a result of this selective enablement, be reordered as required and stored in flip-flops 150—1 through 150—*n*.

During the synchronization time slot following this frame, the frame timer 350 makes frame control signal $\delta$ FALSE and frame control signal $\gamma$ TRUE. Shift register 110 is then parallel enabled, by virtue of its parallel-enabling input terminal P being made TRUE by the $\gamma$ signal on control line 353. The decoder 250 is designed to make each of control lines 251—1 through 251—*n* TRUE simultaneously during the synchronization time slot. Therefore, the network clock pulse $\epsilon$ from network clock 300 occurring during the synchronization time slot is directed via control line 354 to each of the clock input terminals C of flip-flops 150—1 through 150—*n*, as well as to the clock input terminal C of shift register 110. When these clock pulses are received, it is seen that each flip-flop will exchange contents with the corresponding stage of shift register 110.

This exchange of contents takes place in one time slot. The bit stored in flip-flop 150—*i* appears at output terminal Q of that flip-flop when the aforementioned clock pulse is presented at its clock input terminal C. This output terminal is connected to input lead 113—*i* of shift register 110. Therefore, since the clock pulse in this time slot is also received at clock input terminal C of shift register 110, the bit previously stored in flip-flop 150—*i* is transferred to shift register stage 111—*i*.

The same clock pulse applied to shift register 110 also causes the D input of flip-flop 150—*i* to sense the bit present on output line 114—*i* of stage 111—*i*. The connection between output line 114—*i* and the D input of flip-flop 150—*i* is established by the $\gamma$ signal and involves a path through AND-gate 130—*i* and OR-gate 140—*i*. Flip-flop 150—*i* acts to store the bit previously stored in stage 111—*i*. Thus it is seen that the transfer of contents between stage 111—*i* and flip-flop 150—*i* takes place in a single synchronization time slot. The delay which is incorporated into each flip-flop 150—*i* prevents the occurrence of a "race condition."

In the next *n* traffic time slots, shift register 110 will again be serially enabled and the decoder 250 will again select one control line per time slot to enable a flip-flop to store a bit from line 12 and to transmit a previously stored bit on line 13.

Recapitulating, this repetitive sequence of operations will cause bits from line 10 to be read in order into shift register 110 during the traffic time slots of one frame, to be transferred and stored in the same order in flip-flops 150—1 through 150—*n* in the synchronization time slot of the next frame, and to be transmitted to line 13 one at a time in the traffic time slots of this latter frame in an order determined by the contents of control memory 200. Simultaneously, bits from line 12 are read into flip-flops 150—1 through 150—*n* in the aforementioned order determined by the contents of control memory 200. These bits are transferred to corresponding stages of shift register 110 in the synchronization time slot of the next frame and are transmitted serially to line 11 during the traffic time slots of that frame.

Figure 5A:
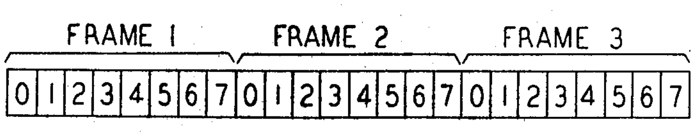
FIGS. 5A–5E show representations of binary signals useful in illustrating the operation of the bilateral time slot interchanger of FIG. 3.
Figure 5B:
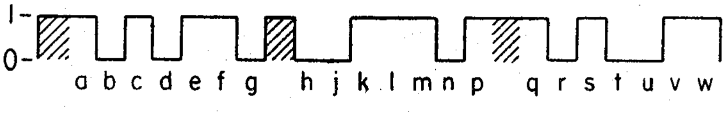
Figure 5C:
Figure 5D:
Figure 5E:
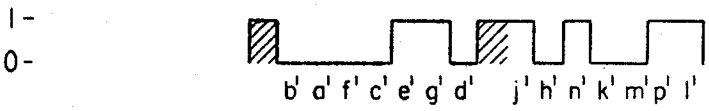

The time slot mappings which are performed as a result of the operation of the time slot interchanger of FIG. 3 can be explained in greater detail by reference to FIGS. 5A–5E. In FIG. 5A are shown representations of the time slots of three consecutive frames. In FIGS. 5B–5E are shown examples of binary signals appearing on lines 10, 11, 12, and 13. Input binary signals on line 10 are shown in FIG. 5B, and reordered output signals on line 13 corresponding to these input signals are shown at FIG. 5C. Input binary signals on line 12 are shown in FIG. 5D, and reordered output signals corresponding to these latter input signals are shown at FIG. 5E.

The input signals on line 10, shown in FIG. 5B, are represented graphically, the ordinate of the graph indicating binary values of "1" and "0." The synchronization time slot in each frame is represented by a shaded block, since its logical value is not important in the present context. In practice the signal level of the synchronization time slot may represent a logical value of "1" or "0," or the signal level may correspond exactly to neither of these logical values, depending on the characteristics of the circuit elements involved.

The binary signals of frame 1 of FIG. 5B are mapped into a reordered sequence of binary signals appearing in frame 2 of FIG. 5C. The bit labeled *a* in time slot 1 of frame 1 appears in time slot 2 of frame 2. The bit labeled *b* of time slot 2 of frame 1 appears in time slot 1 of frame 2. The bit labeled *c* appearing in time slot 3 of frame 1 appears in time slot 6 of frame 2. Likewise, the remaining bits in frame 1 are reordered in a manner indicated in FIGS. 5B and 5C. The one-frame delay between the input binary signals and the reordered output binary signals is accounted for by the fact that the signals from line 10 are stored in one frame and transmitted on line 13 in the next frame.

In like manner the bits labeled *h, j, k, l, m, n* and *p* of time slots 1 through 7 of frame 2 in FIG. 5B are mapped into time slots 1 through 7 of frame 3 of FIG. 5C in accordance with the same mapping described in the preceding paragraph. The mapping between the bits received from line 10 and those transmitted to line 13 remains constant for all succeeding frames until the time slot interchanger is called upon to set up a new call or to release a completed call. Details of the call setup and release procedures will be discussed later.

FIG. 5D shows an input sequence of signals appearing on line 12. FIG. 5E shows a reordered sequence of signals corresponding to these latter input signals, which reordered signals appear upon line 11 after a one frame delay. The mapping of the signals in FIG. 5D into the signals represented in FIG. 5E is not the same as the mapping previously described between the signals represented in FIG. 5B and the signals represented in FIG. 5C. It is, however, predetermined by the latter mapping. Since bit $a$ is mapped from time slot 1 to time slot 2 between its appearance on line 10 and its latter appearance on line 13, bit $b'$ will be mapped from time slot 2 to time slot 1 between its appearance on line 12 and its later appearance on line 11. Likewise since bit $b$ is mapped from time slot 2 to time slot 1 between its appearance on line 10 and its later appearance on line 13, bit $a'$ will be mapped from time slot 1 to time slot 2 between its appearance on line 12 and its later appearance on line 11. Similarly, since bit $c$ of FIGS. 5A and 5B is mapped from time slot 3 to time slot 6, bit $f'$ of FIGS. 5D and 5E will be mapped from time slot 6 to time slot 3. The mapping according to which signals appear on line 12 as represented in FIG. 5D are mapped into signals which appear on line 11 as represented in FIG. 5E remains constant from frame to frame until a call setup or release operation is required.

The above-described mappings are determined in accordance with the contents of control memory 200 shown in FIG. 3. One word from this control memory 200 is accessed in each time slot and decoded in decoder 250. The result of each decoding operation is to enable one of control lines 251–1 through 251–$n$. The sequence in which these control lines are enabled determines the reordering of the bits in that frame.

Figures 6, 7:
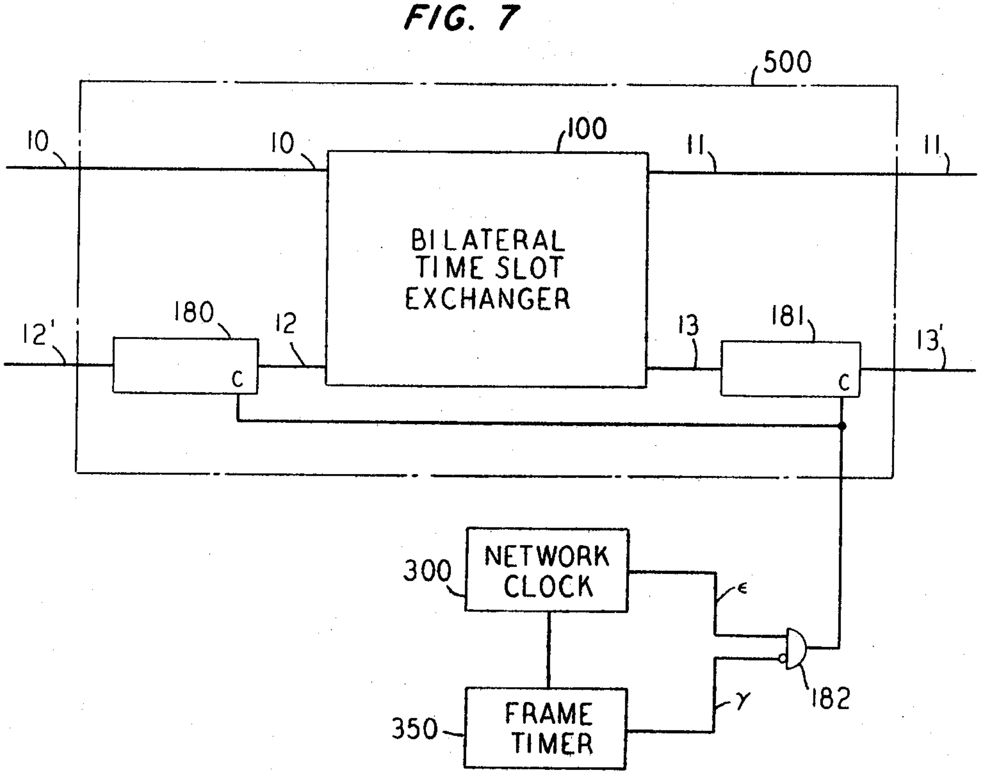
FIG. 6 shows a representation of typical contents of a control memory used in conjunction with the operation of a bilateral time slot interchanger in accordance with the present invention.
FIG. 7 shows a bilateral time slot interchanger incorporating features useful for efficient call setup and release.

FIG. 6 shows sample contents of control memory 200 which may be used to produce the mappings illustrated in FIGS. 5A–5E. Each row in FIG. 6 represents a control memory word which is accessed and decoded in one time slot. Each word can be considered a binary representation of the number designation of the control line which is to be enabled in the time slot in which that word is decoded. Thus the word "011," equal in decimal form to the number 3, causes control line 251–3 to be enabled in the time slot in which it is decoded. In general a control word equal to a decimal number $n$ will, in this example, cause control line 251–$n$ to be enabled in the time slot in which that control word is decoded. The particular coding scheme used in this example is merely illustrative, and many other equivalent schemes could be used, as will be appreciated by those skilled in the art.

By considering the typical control memory contents of FIG. 6 in conjunction with the bilateral time slot interchanger and associated circuitry of FIG. 3 and the typical data signals of FIGS. 5A–5E, a full understanding of the operation of the bilateral time slot interchanger can be gained.

In time slot 1 of frame 1, a bit $a$ is present on line 10 and bit $a'$ is present on line 12. Bit $a$ will be read into shift register stage 111–1 of shift register 110. The control word "110" will be accessed and decoded in this time slot, thereby to enable control line 251–6. Therefore bit $a'$ will be read into flip-flop 150–6. In time slot 2 of frame 1, bit $b$ is present on line 10 and bit $b'$ is present on line 12. Bit $b$ will be read into stage 111–1 while bit $a$ is shifted to stage 111–2 of shift register 110. The control word "111," when decoded, will cause the enablement of control line 251–7. Therefore bit $b'$ will be read into flip-flop 150–7.

At the end of frame 1, stages 111–1 through 111–7 of shift register 110 will contain bits $g, f, e, d, c, b,$ and $a$, respectively. Flip-flops 150–1 through 150–7 will contain bits $d', g', e', c', f', a'$ and $b'$, respectively.

In time slot "0" of frame 2 the frame control signal on control line 353 becomes TRUE, thereby causing the contents of flip-flops 150–1 through 150–7 to be exchanged with the contents of corresponding shift register stages 111–1 through 111–7. Therefore, at the conclusion of time slot "0," shift register stages 111–1 through 111–7 will contain bits $d', g', e', c', f', a'$, and $b'$, respectively, and flip-flops 150–1 through 150–$n$ will contain bits $g, f, e, d, c, b,$ and $a$, respectively.

In time slot 1 of frame 2, bit $b'$ will be shifted out of stage 111–7 and will appear on output line 11. The remaining bits in shift register 110 will be shifted one stage rightward and bit $h$ from input line 10 will be stored in stage 111–1. The control word "110" will cause enablement of control line 251–6. The enablement of control line 251–6 will in turn cause bit $b$ to be sent from storage in flip-flop 150–6 to output line 13. Simultaneously, bit $h'$ from input line 12 will be stored in flip-flop 150–6, replacing bit $b$.

In time slot 2 of frame 2, bit $a'$ will be shifted out of stage 111–7 and will appear on output line 11. The remaining bits in shift register 110 will be shifted one stage rightward, and bit $j$ from input line 10 will be stored in stage 111–1. The control word "111" will cause enablement of control line 251–7, which in turn will cause bit $a$ to be sent from storage in flip-flop 150–7 to output line 13. Simultaneously bit $j'$ from input line 12 will be stored in flip-flop 150–7, replacing bit $a$.

Operation of the bilateral time slot interchanger 100 will continue in a similar manner during the remaining time slots 3–7 of frame 2. During these time slots, bits $f', c', e', g'$, and $d'$ will appear on output line 11 as they are shifted in order out of shift register 110. Bits $k$, $l$, $m$, $n$, and $p$ will enter shift register 110 from input line 10. Control lines 251–4, 251–1, 251–3, 251–5, and 251–2 will be enabled in order to cause bits $d, g, e, c,$ and $f$ to appear on output line 13 and to allow bits $k'$, $l'$, $m'$, $n'$, and $p'$ to enter from input line 12 and be stored in flip-flops 150–4, 150–1, 150–3, 150–5, and 150–2, respectively.

It is easily seen that the signals represented in frame 3 are consistent with continued operation of the time slot interchanger and its associated circuitry as outlined in the preceding paragraphs. The bilateral time slot interchanger will continue performing the same time slot mappings until the contents of control memory 200 are changed to allow the setup of an added call or the release of a completed one.

In the above description, all of the available time slots have been used for call connections. If the full capacity of $n$ traffic time slots is not required, the unused time slots will either be packed at the end of each frame in the case of a switching system of the crosspoint storage type, or will be scattered throughout the frame in the case of a more conventional switching system. These unused time slots may typically contain bits of binary value "0."

It should be noted that the setup and release of calls being processed by the bilateral time slot interchanger do not require the provision of additional time slots beyond the $n$ available traffic time slots. Instead, these operations take place during existing time slots.

As previously mentioned, time slot interchanger 100 of FIG. 3 is suitable for use not only in conventional time division multiplex systems, but also in systems wherein the time slot assignments of existing calls are subject to change upon setup of a new call or release of a completed call. If conventional time slot interchangers, such as are discussed with respect to FIG. 5 of the aforementioned Inose U.S. Pat. No. 3,461,242, are used in systems of the latter type, it is found that a "drop-repeat" problem arises. In such systems when time slot assignments are rearranged, the relative positions of any two connected channels are in general changed. If, for example, an initial condition exists in which channel A uses an earlier time slot than channel B and a succession of rearrangements then causes channel A to use a later time slot than channel B, it would be necessary at some time to repeat a sample from channel A and to drop a sample from channel B, if a time slot interchanger as illustrated in FIG. 5 of the Inose patent were used. The time slot interchanger of the present invention is designed to avoid this "drop-repeat" problem.

In order to facilitate addition of a new call in systems wherein time slot assignments of existing calls are subject to change, the first altered frame including data for one connection in a new call should arrive on input line 10 of FIG. 3 one frame before the corresponding first altered frame including data for the other connection in a new call arrives on input line 12. If the altered frames arrive in this manner, the stage of shift register 110 occupied by the first altered frame from line 10 will be indicative of which of flip-flops 150—1 through 150—$n$ should interact with lines 12 and 13 in the time slot in the next frame occupied by the new call. Calls which had previously used this flip-flop or a lower-numbered flip-flop will have their corresponding control memory words decremented by 1. Other control memory words will remain unaltered. The control memory word identifying the flip-flop to be used by the new call should be added so that it is accessed in the time slot occupied by the new call. Its initial access should be in the frame in which the first altered frame arrives on line 12.

A one-frame delay between the arrival of the first altered frame on line 10 and the arrival of the first altered frame on line 12 therefore allows any call setup operations to be completed in two frames without the necessity of dropping or repeating any samples.

Similarly, a call to be taken down may be easily released if the last unaltered frame from line 10 arrives one frame before the last unaltered frame from line 12. If this is done, the stage of shift register 110 occupied by the call to be deleted will be indicative of which of flip-flops 150—1 through 150—$n$ should interact with lines 12 and 13 in the time slot in the next frame occupied by the call to be released. In the next frame calls using lower-numbered flip-flops will have their control memory words incremented by 1. Other memory words will be left unaltered. The control memory word identifying the released call should be deleted from the control memory after it is accessed in the frame in which the last unaltered frame arrives on line 12.

It is therefore evident that a one-frame delay between the arrival of the last unaltered frame on line 10 and the arrival of the last unaltered frame on line 12 allows call release operations to be completed in two frames, again, without the necessity of dropping or repeating samples.

From the above discussion it is clear that it is desirable that the first altered frame arrive on line 10 one frame before the first altered frame arrives at line 12, for both the case of call setup and that of call release in systems wherein time slot assignments are subject to change. Most commonly, however, the bilateral time slot interchanger will be located in a network, such as will be described in detail with reference to FIG. 8 including a number of switching stages between line 10 and one set of line unit highways and an equal number of switching stages between line 12 and another set of line unit highways. Using the apparatus thus far described, therefore, it would be required that call setup and deletion operations be started at the line unit highways one frame apart.

It is more desirable, however, to be able to start the alterations required for call setup and deletion at both sets of line unit highways in the same frame. Timing of the setup and release procedures in the switching stages and line unit highways is much easier if this is the case. Alterations can be started at both sets of line unit highways in the same frame if delays of one frame are provided in input line 12 and in output line 13. This can be done through the provision of simple n-stage unidirectional shift registers in the lines 12 and 13 as shown in FIG. 7.

In FIG. 7 n-stage shift register 180 is shown with its output connected to line 12 of bilateral time slot interchanger 100. The input of shift register 180 forms a new input line 12'. Similarly, output line 13 is connected to the input of another n-stage shift register 181. The output of shift register 181 forms a new output line 13'. The clock inputs C of shift registers 180 and 181 are each connected to the output of an AND gate 182 with one "inhibit" input. The normal input to AND gate 182 is the network clock signal $\epsilon$ from network clock 300. The inverted input is the frame control signal $\gamma$ from frame timer 350.

AND gate 182 furnishes clock signals to shift registers 180 and 181 in every time slot except the synchronization time slot, in which the $\gamma$ signal inhibits the clock signal. Shift register 180 therefore provides the one-frame delay necessary so that altered frames started simultaneously at the line unit highways arrive on line 10 one frame before their arrival on line 12. Shift register 181 is necessary to provide a one-frame delay in output line 13 so that word synchronism at the receiving line unit highways will be maintained. It should be noted that the delay from line 12' to line 11 is the same as that from line 10 to line 13'. Therefore, altered frames started at the transmitting line unit highways simultaneously will arrive simultaneously at the receiving line unit highways. This feature simplifies the timing of call setup and release procedures. The bilateral time slot interchanger 100 together with delaying shift registers 180 and 181 is designated bilateral time slot interchanger 500.

Figure 8:
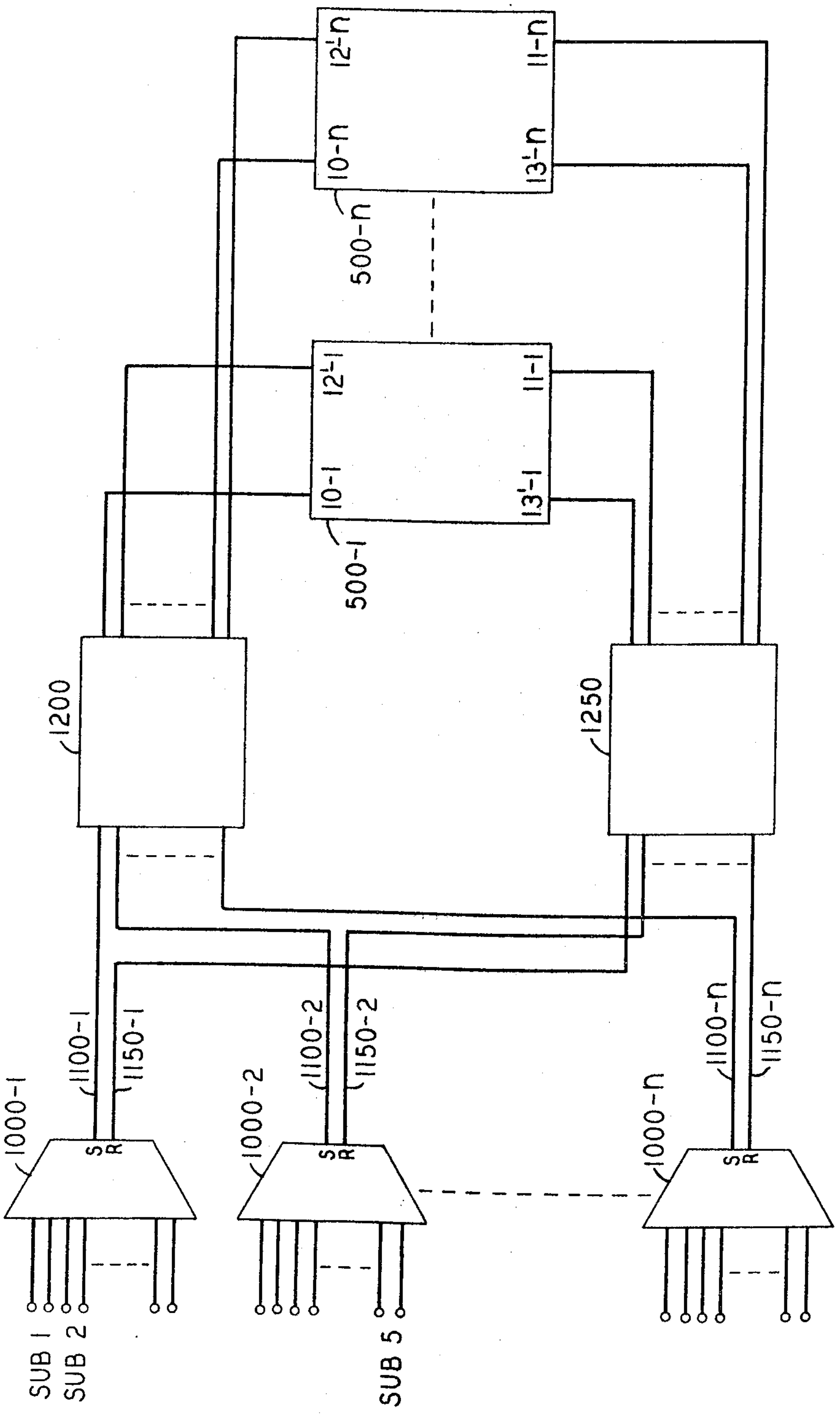
FIG. 8 shows a typical arrangement of a time division switching system incorporating bilateral time slot interchangers of the type shown in FIG. 7.

FIG. 8 illustrates an embodiment of a switching system wherein bilateral time slot interchangers are included in links connecting switching networks. Details of the organization of a switching system similar to that of FIG. 8, but using more conventional, nonbilateral, time slot interchangers appear in the aforementioned Inose et al. U.S. Pat. No. 3,461,242. In the system of FIG. 8, concentrators 1000—1 through 1000—*n* multiplex individual subscriber line pairs SUB1, SUB2, etc., onto transmitting line unit highways 1100—1 through 1100—*n* and also demultiplex receiving line unit highways 1150—1 through 1150—*n* onto the same subscriber line pairs. Concentrators 1000—1 through 1000—*n* may be of the general type described, for example, in U.S. Pat. No. 3,172,956 issued to Inose et al. on Mar. 9, 1965.

In FIG. 8 transmitting line unit highways 1100—1 through 1100—*n* are connected through switching network 1200 to input lines 10–1 through **10–*n* and 12′–1 through 12′–*n*** of time slot interchangers 500—1 through 500—*n*. These bilateral time slot interchangers are of the type previously described with reference to FIG. 7. Receiving line unit highways 1150—1 through 1150—*n* are connected through switching network 1250 to output lines 11—1 through 11—*n* and 13′—1 through **13′—*n*** of time slot interchangers 500—1 through 500—*n*. Switching networks 1200 and 1250 may comprise junctor gate networks of standard design wherein input lines are selectably connected to different output lines in different time slots. Preferably, however, these switching networks are of the crosspoint storage variety referred to previously.

In the routine operation of the switching system of FIG. 8, time multiplexed signals on transmitting line unit highways 1100—1 through 1100—*n* enter switching network 1200 where connections are completed in appropriate time slots to input lines 10—1 through 10—*n* and 12′—1 through **12′—*n*** of the several bilateral time slot interchangers 500—1 through 500—*n*. Each bilateral time slot interchanger 500—*i* provides appropriate time slot rearrangement and furnishes output signals on its output lines **13′—*i*** and 11—*i*. These output signals are routed to switching network 1250 which provides appropriate connections to receiving line unit highways 1150—1 through 1150—*n*.

For the sake of illustration, it will be assumed that subscriber SUB1 is engaged in a conversation with subscriber SUB5, and that switching networks 1200 and 1250 are of the junctor gate variety, which do not provide time slot interchanger capability. Subscriber SUB1 may be assigned to time slot 1, for example, by concentrator 1000—1. Therefore sampled signals from subscriber SUB1 appear on transmitting line unit highway 1100—1 in time slot 1 of each frame. Switching network 1200 connects line unit highway 1100—1 to an input line 10 of one of the time slot interchangers, input line 10—1 of time slot interchanger 500—1 for example, during time slot 1. If subscriber SUB5 is constrained by concentrator 1000—2 to transmit and receive on time slot 2, then bilateral time slot interchanger 500—1 must transpose bits received in time slot 1 from line 10—1 to time slot 2 to be transmitted on line 13′—1. Line 13′—1 of bilateral time slot interchanger 500—1 is routed to switching network 1250, where connection is made in time slot 2 between this line and receiving line unit highway 1150—2. Concentrator 1000—2 demultiplexes the signals it receives on line unit highway 1150—2 and converts the sample signals in time slot 2 into a close approximation of the original message sent by subscriber S1 for delivery to subscriber S5.

Subscriber S5, in turn, must transmit signals back to subscriber S1. The message from subscriber S5 is sampled and multiplexed into time slot 2 on transmitting line unit highway 1100—2. Connection is made in switching network 1200 during time slot 2 between line unit highway 1100—2 and line 12′—1 of bilateral time slot interchanger 500—1. Bilateral time slot interchanger 500—1 transposes the bits received in time slot 2 to time slot 1 for output on line 11—1. Line 11—1 from bilateral time slot interchanger 500—1 is connected in time slot 1 via switching network 1250 to receiving line unit highway 1150—1. Concentrator 1000—1 demultiplexes the signals on line unit highway 1150—1 and converts the binary signals in time slot 1 into a close approximation of the original message from subscriber S5 for delivery to subscriber S1.

The control memories and associated decoders which are associated with the bilateral time slot interchangers 500—1 through 500—*n* are not shown in FIG. 8, but it is assumed that they are of the type described with reference to FIG. 3. The contents of each control memory will be determined by a central network control which directs the progress of the calls in the entire switching system. The concept of several local control memories under the direction of a central network control is a familiar one in the communication switching art. Details of such an arrangement are readily worked out and are not critical to the understanding of the present invention. For reference to details of a network arrangement wherein time slot interchanger control memories are controlled by central control apparatus, reference is made to the aforementioned Inose U.S. Pat. No. 3,461,242.

The preceding description of a typical conversation between subscribers SUB1 and SUB5 was given, for the sake of simplicity, with reference to a system in which switching networks 1200 and 1250 are of the conventional junctor gate variety. If these switching networks are of the bilateral storage variety instead, these networks themselves will provide additional time slot interchanges. When calls are set up and taken down in systems of the latter type, networks 1200 and 1250 may rearrange the time slot assignments of existing calls. As noted earlier, time slot interchangers 500—1 through 500—*n* are especially suited for use in such a system since they can easily accommodate reassignment of existing calls without the necessity for dropping or repeating bits.

The invention described herein has been illustrated with reference to a particular embodiment. It is to be understood that many details used to facilitate the description of such a particular embodiment are chosen for convenience only and are not limitations on the scope of the invention. In particular, such details, the number of time slots in a frame, the number of bits in a time slot, and the types of control memories used, for example, can be varied, as will be appreciated by those skilled in the art, without departing from the scope of this invention. Accordingly, this invention is intended to be limited only by the scope and spirit of the appended claims.

I claim:

1. In combination in a time slot interchanger circuit, first register means for receiving and transmitting binary signals in sequential time slots of a time division multiplex signal frame, second register means for receiving and transmitting binary signals in selected time slots of a time division multiplex signal frame, and means for exchanging the contents of said first register means with the contents of said second register means during one time slot of each time division multiplex signal frame.

2. The apparatus of claim 1 wherein said first register means comprises a shift register having $n$ stages for transferring binary signals applied at the first of said $n$ stages to successive stages of said shift register in each time slot, and wherein said second register means comprises $n$ binary signal storage devices and means for selectively enabling one of said binary signal storage devices in each time slot so that the selected storage device is enabled to transmit a previously stored binary signal and receive a new binary signal to be stored.

3. Apparatus for receiving first and second sequences of binary signals, for permuting the ordering of the signals in each of said first and second sequences, and for transmitting first and second permuted sequences of binary signals, comprising:

first and second input lines;

first and second output lines;

first storage means connected to said first input line and said second output line;

second storage means connected to said second input line and said first output line;

interconnecting means connecting said first storage means with said second storage means;

first control means associated with said first storage means for enabling said first storage means to receive and store sequentially said first sequence of binary signals on said first input line, and, simultaneously, to transmit sequentially said second permuted sequence of binary signals on said second output line;

second control means associated with said second storage means for enabling said second storage means to receive said second sequence of binary signals on said second input line so that said second sequence of binary signals is stored in said second storage means in permuted order and, simultaneously, to transmit in permuted order said first sequence of binary signals on said first output line; and third control means for periodically activating said interconnecting means to cause the binary signals stored in said first storage means to be exchanged with the binary signals stored in said second storage means.

4. Apparatus adapted to operate in accordance with time base signals defining $n+1$ time slots in repetitive signal frames for receiving first and second sequences of binary signals in $n$ successive time slots, for permuting the ordering within each frame of the signals in each of the first and second sequences, and for transmitting first and second permuted sequences of binary signals, comprising:

first and second input lines;

first and second output lines;

first storage means connected to said first input line and said second output line;

second storage means connected to said second input line and said first output line;

interconnecting means connecting said first storage means with said second storage means;

first control means associated with said first storage means for enabling said first storage means, during the last $n$ time slots of each frame, to receive and store sequentially $n$ binary signals from the first sequence on said first input line, and, simultaneously, to transmit sequentially $n$ previously stored binary signals from the second permuted sequence on said second output line;

second control means associated with said second storage means for enabling said second storage means, during the last $n$ time slots of each frame, to receive $n$ binary signals from said second sequence on said second input line and to store these signals in permuted order, and, simultaneously, to transmit in permuted order $n$ previously stored binary signals from the first sequence of binary signals of said first output line; and third control means operative in the first time slot of each frame to activate said interconnecting means to cause the $n$ binary signals from said first sequence stored in said first storage means to be exchanged with the $n$ binary signals from the second sequence stored in permuted order in said second storage means.

5. The apparatus of claim 4 further comprising:

means in series with said second input line for delaying the arrival of the second sequence at said second storage means for a period of one frame, and means in series with said second output line for providing a delay of one frame in the transmission of the first permuted sequence from said second storage means.

6. A time division multiplex communication system comprising:

a plurality of line unit input highways, a plurality of line unit output highways, first and second switching networks each having a set of input connections and a set of output connections, means for coupling said plurality of line unit input highways to the set of input connections of said first switching network, means for coupling said plurality of line unit output highways to the set of output connections of said second switching network, and a plurality of bilateral time slot interchanging means for providing time slot interchangeable coupling from a first subset of the set of output connections of said first switching network to a first subset of the set of input connections of said second switching network, and complementary time slot interchangeable coupling from a second subset of the set of output connections of said first switching network to a second subset of the set of input connections of said second switching network, each of said bilateral time slot interchanging means comprising first register means connecting one of the first subset of the set of output connections of said first switching network to one of the second subset of the set of input connections of said second switching network, second register means connecting one of the second subset of the set of output connections of said first switching network to one of the first subset of the set of input connections of said second switching network, and means for periodically exchanging the contents of said first register means with the contents of said second register means.

7. The method comprising the steps of:

*a.* establishing in successive time division multiplex signal frames a plurality of time slots,

*b*. storing, during each of said time slots, first and second sequences of binary signals in first and second storage means, respectively, said first sequences being stored sequentially and said second sequences being stored in a permuted order,

*c*. exchanging the contents of said first and second storage means periodically without altering the order of each stored sequence,

*d*. transmitting sequentially those signals stored in said first storage means after said exchange, and

*e*. transmitting in said permuted order those signals stored in said second storage means after said exchange.

* * * * *